US008571730B1

(12) United States Patent
Andoh

(10) Patent No.: US 8,571,730 B1
(45) Date of Patent: Oct. 29, 2013

(54) ATTITUDE CONTROL DEVICE FOR IN-SPACE PROPELLANT DEPOT

(71) Applicant: Fukashi Andoh, Toyota (JP)

(72) Inventor: Fukashi Andoh, Toyota (JP)

( * ) Notice: Subject to any disclaimer, the term of this patent is extended or adjusted under 35 U.S.C. 154(b) by 0 days.

(21) Appl. No.: 13/723,198

(22) Filed: Dec. 21, 2012

(51) Int. Cl.
*B64G 1/36* (2006.01)
(52) U.S. Cl.
USPC .......................................... 701/13
(58) Field of Classification Search
None
See application file for complete search history.

(56) References Cited

U.S. PATENT DOCUMENTS

| | | | | |
|---|---|---|---|---|
| 3,940,096 A | * | 2/1976 | Keigler et al. | 244/165 |
| 4,275,861 A | * | 6/1981 | Hubert | 244/165 |

\* cited by examiner

*Primary Examiner* — Thomas Tarcza
*Assistant Examiner* — Adam Alharbi

(57) ABSTRACT

An attitude control device for an in-space propellant depot. A propellant height sensor generates a measured propellant height. A sloshing frequency calculation unit calculates a sloshing frequency based on the measured propellant height. An attitude angle sensor generates a measured attitude angle. A frequency analysis unit generates a plurality of frequency spectra of the measured attitude angle. A dominant flexible mode calculation unit calculates a dominant flexible mode based on the plurality of frequency spectra. A modal coordinate calculation unit calculates a modal coordinate of the dominant flexible mode. A control torque parameter generator calculates a control torque parameter minimizing spectral amplitude of the plurality of frequency spectra. A control torque generator calculates a term of a control torque until the spectral amplitude of the plurality of frequency spectra no longer exceeds a predetermined value.

1 Claim, 6 Drawing Sheets

ATTITUDE CONTROL DEVICE FOR IN-SPACE PROPELLANT DEPOT

BACKGROUND OF THE INVENTION

The present invention relates to an attitude control device for in-space propellant depot that controls an attitude angle of an in-space propellant depot while suppressing a disturbance torque such as the one due to solar radiation pressure.

In-space propellant depots are generally represented as a nonlinear time varying system with nonlinearlity of its mechanical structure and time-varying inertial moment due to sloshing of propellant, and exhibit subharmonic resonance, superharmonic resonance and parametric resonance together with primary resonance when exposed to the disturbance torque containing a frequency near a resonance frequency of the in-space propellant depots.

U.S. Pat. No. 7,957,854 B2 discloses an active vibration damping system for precision pointing spacecraft that identifies a plurality of system parameters in a transfer function of a spacecraft characterizing dynamics thereof applying a known excitation signal, and generates a control torque for suppressing a vibration of the spacecraft using a reaction wheel based on the plurality of system parameters identified.

The prior art in U.S. Pat. No. 7,957,854 B2, if applied to an in-space propellant depot as in U.S. Pat. No. 7,575,200 B2, introduces undesirable vibration of frequencies near resonance frequencies other than primary resonance frequencies of the in-space propellant depot, and thus fails to suppress effectively the vibration induced by the disturbance torque as a result of its negligence of a plurality of types of resonance causing the vibration.

SUMMARY OF THE INVENTION

The current invention provides an attitude control device for in-space propellant depot controlling an attitude angle of an in-space propellant depot while suppressing a disturbance torque such as the one due to solar radiation pressure.

The attitude control device includes:
- a propellant height sensor measuring a height of a propellant in a propellant tank and sending a measured propellant height;
- a sloshing frequency calculation unit calculating a sloshing frequency based on the measured propellant height in the propellant tank and gravitational acceleration acting on the in-space propellant depot in an orbit, the in-space propellant depot is deployed, and sending the sloshing frequency;
- an attitude angle sensor measuring the attitude angle of the in-space propellant depot and sending it as a measured attitude angle of the in-space propellant depot;
- a frequency analysis unit conducting a frequency analysis of the measured attitude angle of the in-space propellant depot, generating its frequency spectra, and sending a plurality of frequency spectra;
- a dominant flexible mode calculation unit calculating a dominant flexible mode, and sending it where the dominant flexible mode is a flexible mode of the in-space propellant depot, a flexible mode natural frequency of which is closest to either a spectral frequency of one of the plurality of frequency spectra with a largest spectral amplitude if only one such spectral frequency exists; a smaller one of two spectral frequencies of one of two frequency spectra with a largest spectral amplitude if two such spectral frequencies exist, and a larger one of two spectral frequencies is odd-number times as large as the smaller one of two spectral frequencies; or a spectral frequency of one of three frequency spectra with a largest spectral amplitude (hereinafter referred to as a "dominant spectral frequency"), spectral frequencies of others being larger than the dominant spectral frequency by the sloshing frequency, and an absolute value of a difference between the dominant spectral frequency and the sloshing frequency, if three such spectral frequencies exist;
- a modal coordinate calculation unit calculating a modal coordinate of the dominant flexible mode applying a modal transformation to the measured attitude angle, and sending it;
- a control torque parameter generator calculating a control torque parameter that is a damping ratio to be added to the dominant flexible mode adjusted to minimize the spectral amplitude of the plurality of frequency spectra of the dominant flexible mode, and sending the control torque parameter; and
- a control torque generator calculating a term of a control torque for reducing the spectral amplitude of the dominant flexible mode as a product of the modal coordinate, the control torque parameter and 1p element of a modal matrix of the modal transformation where p is a number of the dominant flexible mode, adding it to a control torque calculated in a previous iteration, and sending it until the spectral amplitude of all the frequency spectra no longer exceeds a predetermined value tolerable by the in-space propellant depot.

This construction causes a vibration of the attitude angle due to sloshing of the propellant and nonlinearlity of in-space propellant depot structure to be reduced to a level tolerable in an operation of the in-space propellant depot while order of control and thus a computational load are minimized.

BRIEF DESCRIPTION OF THE DRAWINGS

The novel features of the invention will be readily understood and appreciated by reference to the following detailed description taken in conjunction with the drawings, in which.

DETAILED DESCRIPTION OF THE INVENTION

Figure 3:
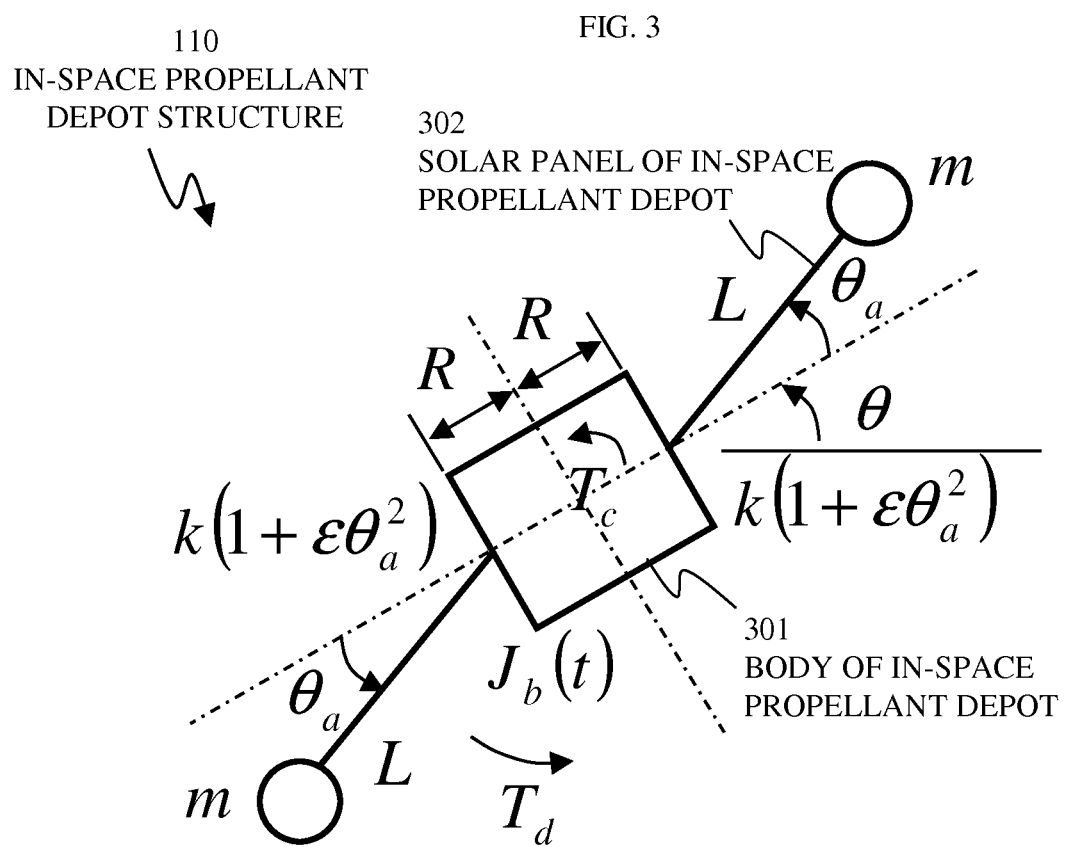
FIG. 3 is a free body diagram of an in-space propellant depot of the type of which an exemplary embodiment of the invention may be advantageously employed.

FIG. 3 is a free body diagram of an in-space propellant depot of the type of which an exemplary embodiment of the invention may be advantageously employed. An in-space propellant depot structure 110 that is a mechanical structure of an in-space propellant depot consists of a body of in-space propellant depot 301 and a solar panel of in-space propellant depot 302.

The body of in-space propellant depot 301 consists of a propellant tank for holding a propellant supplied to other spacecrafts, a reaction wheel for changing an attitude angle of an in-space propellant depot, an electronic system for implementing a plurality of functions such as propellant supply and change of attitude angle, and an enclosure holding the propellant tank, the propulsion system and the electronic system.

The solar panel of in-space propellant depot 302 mechanically connects to the body of in-space propellant depot 301, and supplies electric energy converted from solar energy to the electronic system.

Figure 1:
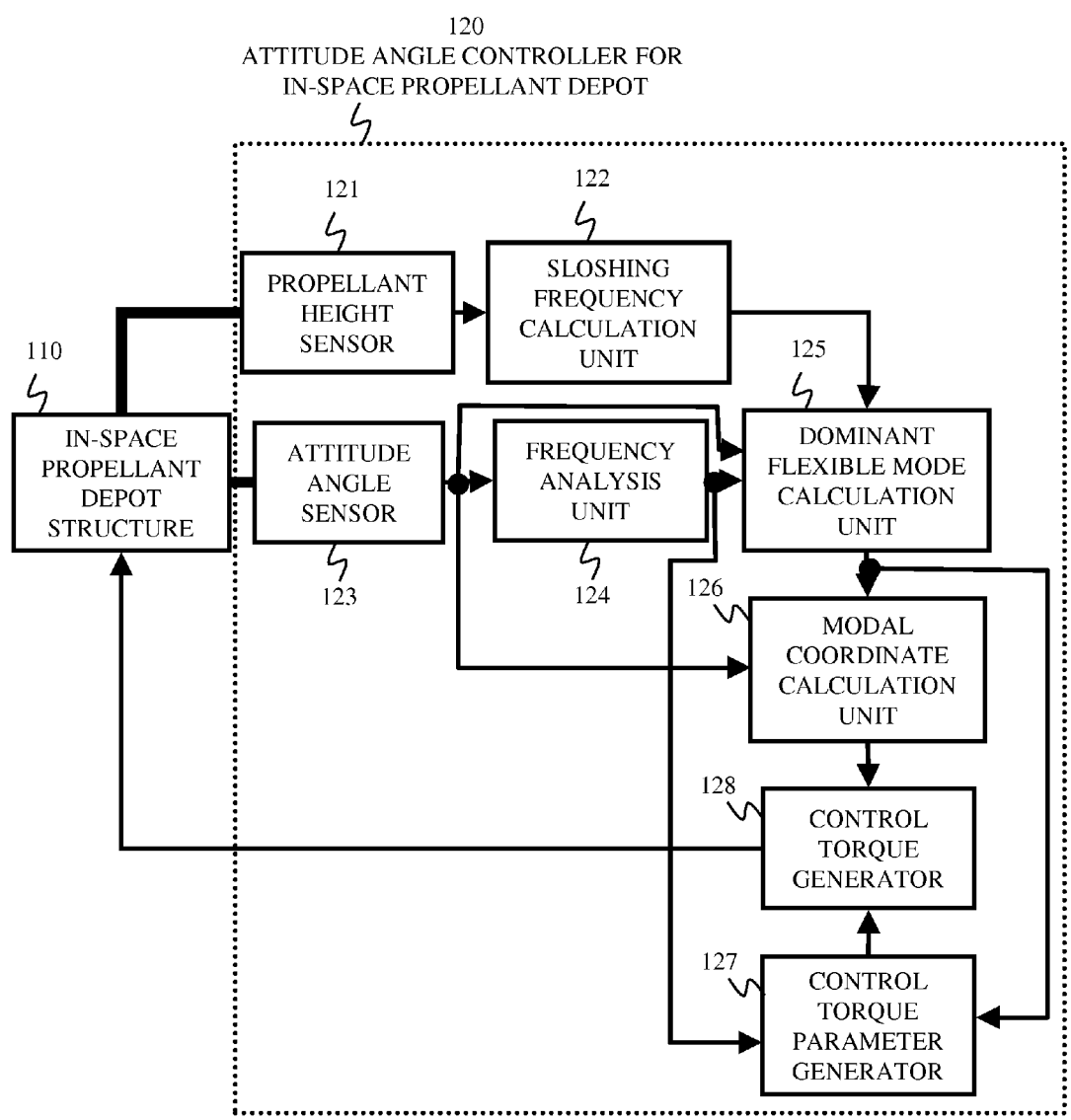
FIG. 1 is a block diagram of an attitude angle controller for in-space propellant depot in accordance with an exemplary embodiment of the invention.

FIG. 1 is a block diagram of an attitude angle controller for in-space propellant depot in accordance with an exemplary embodiment of the invention. The in-space propellant depot includes: the in-space propellant depot structure 110 and an attitude angle controller for in-space propellant depot 120.

The attitude angle controller for in-space propellant depot 120 measures a height of the propellant and an attitude angle of the in-space propellant depot, and generates a control torque that is a torque reference input to the reaction wheel for changing the attitude angle of in-space propellant depot. Detailed description of the attitude angle controller for in-space propellant depot 120 is given together with its functional configuration in what follows.

The attitude angle controller for in-space propellant depot 120 further includes: a propellant height sensor 121, a sloshing frequency calculation unit 122, an attitude angle sensor 123, a frequency analysis unit 124, a dominant flexible mode calculation unit 125, a modal coordinate calculation unit 126, a control torque parameter generator 127, and a control torque generator 128.

The propellant height sensor 121 measures a height of the propellant in the propellant tank and sends a measured propellant height to the sloshing frequency calculation unit 122.

The sloshing frequency calculation unit 122 calculates a sloshing frequency based on the measured propellant height in the propellant tank and gravitational acceleration acting on the in-space propellant depot in an orbit, the in-space propellant depot is deployed, and sends the sloshing frequency to the dominant flexible mode calculation unit 125.

The attitude angle sensor 123 measures the attitude angle of the in-space propellant depot and sends it to the frequency analysis unit 124, the dominant flexible mode calculation unit 125 and the modal coordinate calculation unit 126 as a measured attitude angle of the in-space propellant depot. Example of the attitude angle sensor 123 includes but is not limited to a gyroscopic sensor.

The frequency analysis unit 124 conducts a frequency analysis of the measured attitude angle of the in-space propellant depot, generates its frequency spectra, and sends a plurality of frequency spectra to the dominant flexible mode calculation unit 125 and the control torque parameter generator 127.

The dominant flexible mode calculation unit 125 calculates a dominant flexible mode, and sends it to the modal coordinate calculation unit 126 and the control torque parameter generator 127 where the dominant flexible mode is a flexible mode of the in-space propellant depot, a flexible mode natural frequency of which is closest to either a spectral frequency of one of the plurality of frequency spectra with a largest spectral amplitude if only one such spectral frequency exists; a smaller one of two spectral frequencies of one of two frequency spectra with a largest spectral amplitude if two such spectral frequencies exist, and a larger one of two spectral frequencies is odd-number times as large as the smaller one of two spectral frequencies; or a spectral frequency of one of three frequency spectra with a largest spectral amplitude (hereinafter referred to as a "dominant spectral frequency"), spectral frequencies of others being larger than the dominant spectral frequency by the sloshing frequency, and an absolute value of a difference between the dominant spectral frequency and the sloshing frequency, if three such spectral frequencies exist.

The modal coordinate calculation unit 126 calculates a modal coordinate of the dominant flexible mode applying a modal transformation to the measured attitude angle, and sends it to the control torque generator 128.

The control torque parameter generator 127 calculates a control torque parameter that is a damping ratio to be added to the dominant flexible mode adjusted to minimize the spectral amplitude of the plurality of frequency spectra of the dominant flexible mode, and sends the control torque parameter to the control torque generator 128.

The control torque generator 128 calculates a term of a control torque for reducing the spectral amplitude of the dominant flexible mode as a product of the modal coordinate, the control torque parameter and 1p element of a modal matrix of the modal transformation where p is a number of the dominant flexible mode, adds it to a control torque calculated in a previous iteration, and sends it to the in-space propellant depot structure 110 until the spectral amplitude of all the frequency spectra no longer exceeds a predetermined value tolerable by the in-space propellant depot.

Derived in what follows is a principle whereby the attitude angle controller for in-space propellant depot 120 generates the control torque.

Equations of motion of the in-space propellant depot with a pair of solar panels each of which is represented by a single mass and a spring element as in FIG. 3 are derived as (1) and (3).

$$[J_b(t) + 2m(R+L)^2]\ddot{\theta} + 2m(R+L)L\ddot{\theta}_a = T_d + T_c \quad (1)$$

$$2m(R+L)L\ddot{\theta} + 2mL^2\ddot{\theta}_a = -2k\theta_a - 2\varepsilon k\theta_a^3 \quad (2)$$

$$J_b(t) = \begin{cases} J_{b0} - J_s + \Delta J_b \sin(\omega_s t) & \text{for } t \in \left[\frac{(2n-1)\pi}{2\omega_s}, \frac{(2n-1)\pi}{2\omega_s} + \Delta t_s\right), \\ & n \in \aleph \\ J_{b0} + \Delta J_b \sin(\omega_s t) & \text{otherwise} \end{cases} \quad (3)$$

where $J_b(t)$ is a moment of inertia of a body of the in-space propellant depot [kg·m²], $J_{b0}$ is a moment of inertia of a body of the in-space propellant depot at rest [kg·m²], $J_s$ is a part of moment of inertia of a body of the in-space propellant depot detached from the remaining part when the liquid propellant sloshes [kg·m²], $\Delta J_b$ is an amplitude of fluctuation of moment of inertia of a body of the in-space propellant depot due to sloshing of the liquid propellant [kg·m²], m is a mass of the solar panel [kg], k is a linear part of stiffness of the solar panel [N·m/rad], β is a parameter of a nonlinear part of the stiffness of the solar panel, R is a half width of the body of the in-space propellant depot [m], L is a length of the solar panel [m], θ is an attitude angle of the in-space propellant depot [rad], $\theta_a$ is an appendage angle with respect to the body of the in-space propellant depot [rad], t is time [s], $\Delta t_s$ is a time interval wherein a part of the liquid propellant is detached from the remaining part thereof [s], $T_c$ is a control torque [N·m], $T_d$ is a disturbance torque [N·m], and $\omega_s$ is a sloshing frequency [rad/s] given by (4) according to Housner G. W., "Dynamic analysis of fluids in containers subjected to acceleration. Nuclear Reactors and Earthquakes", Report No. TID 7024, U.S. Atomic Energy Commission, Washington D.C., 1963.

$$\omega_s = \sqrt{\frac{3.68 \, g \tanh\left(3.68 \, \frac{h}{D}\right)}{D}} \quad (4)$$

where h is a height of the propellant in the propellant tank [m] (hereinafter referred to as a "propellant height"), D is a diameter of the propellant tank [m], g is a gravitational acceleration where the in-space propellant depot is deployed [m/s²]. In (4) a cylindrical propellant tank is assumed.

A plurality of homogeneous equations of a linear time invariant part of (1) and (2) are written in a matrix form as (5).

$$\begin{bmatrix} J_{b0}+2m(R+L)^2 & 2m(R+L)L \\ 2m(R+L)L & 2mL^2 \end{bmatrix}\begin{bmatrix} \ddot{\theta} \\ \ddot{\theta}_a \end{bmatrix} + \begin{bmatrix} 0 & 0 \\ 0 & 2k \end{bmatrix}\begin{bmatrix} \theta \\ \theta_a \end{bmatrix} = \begin{bmatrix} 0 \\ 0 \end{bmatrix} \quad (5)$$

Solving an eigenvalue problem of (5) yields a rigid mode natural frequency $\omega_{n0}$ [rad/s] and a flexible mode natural frequency $\omega_{n1}$ [rad/s] in (6) and (7).

$$\omega_{n0} = 0 \quad (6)$$

$$\omega_{n1} = \sqrt{\frac{2k[J_{b0}+2m(R+L)^2]}{2mL^2[J_{b0}+2m(R+L)^2]-4m^2(R+L)^2L^2}} \quad (7)$$

Since (2) includes a term cubic in the appendage angle with respect to the body of the in-space propellant depot $\theta_a$ and (3) includes a time dependent periodic term with the sloshing frequency $\omega_s$, a steady state attitude angle of the in-space propellant depot $\theta$ consists of a plurality of components with frequencies given by (8) through (11).

$$\omega_{e11}=\omega_d \quad (8)$$

$$\omega_{eij}=3\omega_{e(i-1)j}, i\in\{2,3,\ldots\}, j\in\{1,2,\ldots,3^{i-2}\} \quad (9)$$

$$\omega_{ei(3^{i-2}+j)}=\omega_{e(i-1)j}+\omega_s, i\in\{2,3,\ldots\}, j\in\{1,2,\ldots,3^{i-2}\} \quad (10)$$

$$\omega_{ei(2\cdot 3^{i-2}+j)}=|\omega_{e(i-1)j}-\omega_s|, i\in\{2,3,\ldots\}, j\in\{1,2,\ldots,3^{i-2}\} \quad (11)$$

where $\omega_d$ is a frequency of the disturbance torque $T_d$ [rad/s], and (8) thorough (11) can be derived by using a perturbation theory such as Poincare-Lindstedt method. A frequency in (8) is caused by a first term in the right hand side of (2) that is a linear stiffness term, (9) is caused by a second term in the right hand side of (2) that is a cubic nonlinear stiffness term, (10) and (11) are caused by a last term in the right hand side of (3) that is a time variant term.

Moreover the perturbation theory implies that an amplitude of an $\alpha\beta$-th frequency component of the steady state attitude angle of the in-space propellant depot that is a frequency component of the steady state attitude angle of the in-space propellant depot at frequency $\omega_{e\alpha\beta}$ fulfills (12) where $\alpha$ and $\beta$ are a second and third indices in (8) through (11).

$$A_{\alpha\beta} \propto \frac{1}{\sqrt{(\omega_{n1}^2-\omega_{e\alpha\beta}^2)^2+(2\zeta_{n1}\omega_{n1}\omega_{e\alpha\beta})^2}}, \alpha,\beta\in\{1,2,\ldots\} \quad (12)$$

where $A_{\alpha\beta}$ is the amplitude of the $\alpha\beta$-th frequency component of the steady state attitude angle of the in-space propellant depot [rad], $\omega_{e\alpha\beta}$ is an $\alpha\beta$-th excitation frequency [rad/s] that is one of a plurality of frequency components comprising the steady state attitude angle of the in-space propellant depot $\theta$ mentioned above, and $\zeta_{n1}$ is a damping ratio of a flexible mode. The damping ratio of the flexible mode $\zeta_{n1}$ is due to a damping of the solar panel that is present in a real in-space propellant depot but not included in (5) for the sake of brevity.

In the above derivation, each of the pair of solar panels is represented by a single-degree-of-freedom lumped parameter system having only one flexible mode (a frequency thereof is given by (7)). Since each of the pair of solar panels is a distributed parameter system in reality, the in-space propellant depot contains a plurality of flexible modes, a natural frequency of each of which is denoted as $\omega_{np}$, $p\in\aleph$ (hereinafter referred to as a "p-th flexible mode natural frequency").

Assuming a distributed stiffness of each of the solar panels consists of a linear stiffness and a cubic nonlinear stiffness, frequencies of a plurality of frequency components of the steady state attitude angle of the in-space propellant depot $\theta$ are given by (8) through (11). A part of amplitude of the $\alpha\beta$-th frequency component of the steady state attitude angle of the in-space propellant depot depending on the p-th flexible mode natural frequency $\omega_{np}$ is given by (13).

$$A_{\alpha\beta p} \propto \frac{1}{\sqrt{(\omega_{np}^2-\omega_{e\alpha\beta}^2)^2+(2\zeta_{np}\omega_{np}\omega_{e\alpha\beta})^2}}, \quad (13)$$
$$\alpha,\beta\in\{1,2,\ldots\}$$

where $A_{\alpha\beta p}$ is the part of amplitude of the $\alpha\beta$-th frequency component of the steady state attitude angle of the in-space propellant depot depending on the p-th flexible mode natural frequency $\omega_{np}$ [rad], $\zeta_{np}$ is a damping ratio of a p-th flexible mode. In the above, the plurality of flexible modes are numbered in an ascending order of their natural frequencies, and the p-th flexible mode is the flexible mode with the p-th smallest natural frequency that is the p-th flexible mode natural frequency $\omega_{np}$.

In general, the disturbance torque $T_d$ such as solar radiation pressure contains a plurality of frequency components, more than two of which can be close to the plurality of flexible mode natural frequencies of the in-space propellant depot. Letting a q-th frequency component of the disturbance torque as $\omega_{dq}$ (hereinafter referred to as a "q-th disturbance frequency"), a plurality of frequencies of the attitude angle of the in-space propellant depot $\theta$ caused by the q-th disturbance frequency $\omega_{dq}$ are given by (14) through (17).

$$\omega_{e11q}=\omega_{dq}, q\in Q \quad (14)$$

$$\omega_{eijq}=3\omega_{e(i-1)jq}, i\in\{2,3,\ldots\}, j\in\{1,2,\ldots,3^{i-2}\}, q\in Q \quad (15)$$

$$\omega_{ei(3^{i-2}+j)q}=\omega_{e(i-1)jq}+\omega_s, i\in\{2,3,\ldots\}, j\in\{1,2,\ldots, 3^{i-2}\}, q\in Q \quad (16)$$

$$\omega_{ei(2\cdot 3^{i-2}+j)q}=|\omega_{e(i-1)jq}-\omega_s|, i\in\{2,3,\ldots\}, j\in\{1,2,\ldots,3^{i-2}\}, q\in Q \quad (17)$$

where $\omega_{e\cdots q}$ is a ••q-th frequency of the attitude angle of the in-space propellant depot θ caused by the q-th disturbance frequency $\omega_{dq}$ [rad/s] that is a q-th smallest disturbance frequency, Q is a set of indices of a plurality of disturbance frequencies.

A vibration of the attitude angle of the in-space propellant depot θ (hereinafter referred to as a "vibration of attitude angle") with frequencies given by (14) through (17) becomes hazardous only if a frequency in (14) is close to one of a plurality of flexible mode natural frequencies and the vibration of the attitude angle is amplified due to resonance. Therefore, the current invention aims at a reduction of such a vibration (hereinafter referred to as a "hazardous vibration of attitude angle"), and ignores the vibration of attitude angle, frequency of which is away from the plurality of flexible mode natural frequencies.

A part of amplitude of the αβq-th frequency component of the steady state attitude angle of the in-space propellant depending on the p-th flexible mode natural frequency $\omega_{np}$ is obtained by generalizing (13) as (18).

$$A_{\alpha\beta pq} \propto \frac{1}{\sqrt{(\omega_{np}^2-\omega_{e\alpha\beta q}^2)^2+(2\zeta_{np}\omega_{np}\omega_{e\alpha\beta q})^2}}, \quad (18)$$
$$\alpha,\beta \in \{1,2,\ldots\}, q \in Q$$

where $A_{\alpha\beta pq}$ is the part of amplitude of the αβq-th frequency component of the steady state attitude angle of the in-space propellant depot depending on the p-th flexible mode natural frequency $\omega_{np}$ [rad].

The control torque $T_c$ to suppress a vibration of the in-space propellant depot comprising a plurality of disturbance frequencies given in (14) through (17) is derived in what follows. First, a plurality of equations of motion of the in-space propellant depot with a pair of solar panels, each of which is represented as a distributed parameter system are obtained. Then, the plurality of equations of motion of the in-space propellant depot are spacially discretized using a discretization method such as finite element method. The plurality of equations of motion spacially discretized are transformed to a modal form, a linear part of a p-th equation of which can be expressed as (19).

$$\ddot{z}_p + \omega_{np}^2 z_p = \phi_{1p}T_c + \phi_{1p}T_d \quad (19)$$

where $z_p$ is a p-th modal coordinate, $\phi_{1p}$ is a 1p element of a modal transformation matrix that is an inverse matrix of a modal matrix, a p-th column of which is a p-th eigenvector normalized with respect to an inertia matrix of the plurality of equations of motion of the in-space propellant depot spacially discretized as mentioned above. It must be noted that the p-th eigenvector is an eigenvector associated with the p-th flexible mode natural frequency $\omega_{np}$. The control torque $T_c$ given in (20) adds damping to a p-th flexible mode of the in-space propellant depot and significantly suppresses a frequency component of the attitude angle of the in-space propellant depot θ with a frequency given by (14). Consequently, a plurality of frequency components of the attitude angle of the in-space propellant depot θ with frequencies given by (15) through (17) are suppressed, since they are excited by the frequency component of the attitude angle of the in-space propellant depot θ with a frequency given by (14).

$$T_c = -\sum_{p\in P} 2\phi_{1p}^{-1}\zeta_{cp}\dot{z}_p \quad (20)$$

where $\zeta_{cp}$ is a p-th control torque parameter to provide an additional damping to the p-th flexible mode, and P is a set of indices of the plurality of flexible modes, natural frequencies of which are close to a plurality of disturbance frequencies.

To find a flexible mode, a natural frequency of which is close to a smallest of the plurality of disturbance frequencies (hereinafter referred to as a "first dominant flexible mode"), a plurality of frequency spectra of the attitude angle are obtained using a frequency analysis method such as Fourier transform. Then, the dominant flexible mode is calculated as a flexible mode of the in-space propellant depot, a flexible mode natural frequency of which is closest to either a spectral frequency of one of the plurality of frequency spectra with a largest spectral amplitude if only one such spectral frequency exists; a smaller one of two spectral frequencies of one of two frequency spectra with a largest spectral amplitude if two such spectral frequencies exist, and a larger one of two spectral frequencies is three times as large as the smaller one of two spectral frequencies; or a spectral frequency of one of three frequency spectra with the dominant spectral frequency, spectral frequencies of others being larger than the dominant spectral frequency by the sloshing frequency, and an absolute value of a difference between the dominant spectral frequency and the sloshing frequency, if three such spectral frequencies exist.

A first term of a right hand side of (20) with a smallest index p of the first dominant flexible mode is calculated based on the 1p element of a modal transformation matrix $\phi_{1p}$, the p-th control torque parameter $\zeta_{cp}$, and the p-th modal coordinate $z_p$ for the first dominant flexible mode. Application of the first term of (20) suppresses a plurality of frequency components of the attitude angle of the in-space propellant depot θ with frequencies given by (14) through (17) for a first disturbance frequency $\omega_{d1}$. The attitude angle of the in-space propellant depot after applying a term of the right hand side of (20) for the first dominant flexible mode is hereinafter referred to as a "first suppressed attitude angle".

Likewise, a second term of the right hand side of (20) is calculated repeating the aforementioned procedure to obtain the first term of the right hand side of (20) for the in-space propellant depot after applying the first term of the right hand side of (20). With the second term of the right hand side of (20), a plurality of frequency components of the attitude angle of the in-space propellant depot with frequencies given in (14) through (17) for a second dominant flexible mode are suppressed. Successive application of an aforementioned procedure yields entire right hand side of (20) and all dominant flexible modes with p∈P are suppressed.

The aforementioned function of the attitude angle controller for in-space propellant depot 120 is summarized as follows. The propellant height sensor 121 sends the measured propellant height h, and the sloshing frequency calculation unit 122 calculates the sloshing frequency in (4) based on the measured propellant height h. The attitude angle sensor 123 sends the measured attitude angle θ, and the frequency analysis unit 124 calculates the plurality of frequency spectra of the measured attitude angle θ. The dominant flexible mode calculation unit 125 identifies the first dominant flexible mode based on the plurality of frequency spectra of the measured attitude angle θ. The modal coordinate calculation unit 126 converts the measured attitude angle θ to the modal coordinate of the first dominant flexible mode, the index thereof being p. The control torque parameter generator 127 adjusts the control torque parameter $\zeta_{cp}$ for the first dominant flexible mode such that the plurality of spectral amplitudes of the measured attitude angle θ for the first dominant flexible mode are minimized. The control torque generator 128 calculates a term of the control torque for the first dominant flexible mode that is the first term of (20), and sends it to the in-space propellant depot structure 110. Then the above procedure is iterated until the spectral amplitude of all the frequency spectra of the measured attitude angle θ no longer exceeds a predetermined value tolerable by the in-space propellant depot.

Figure 2:
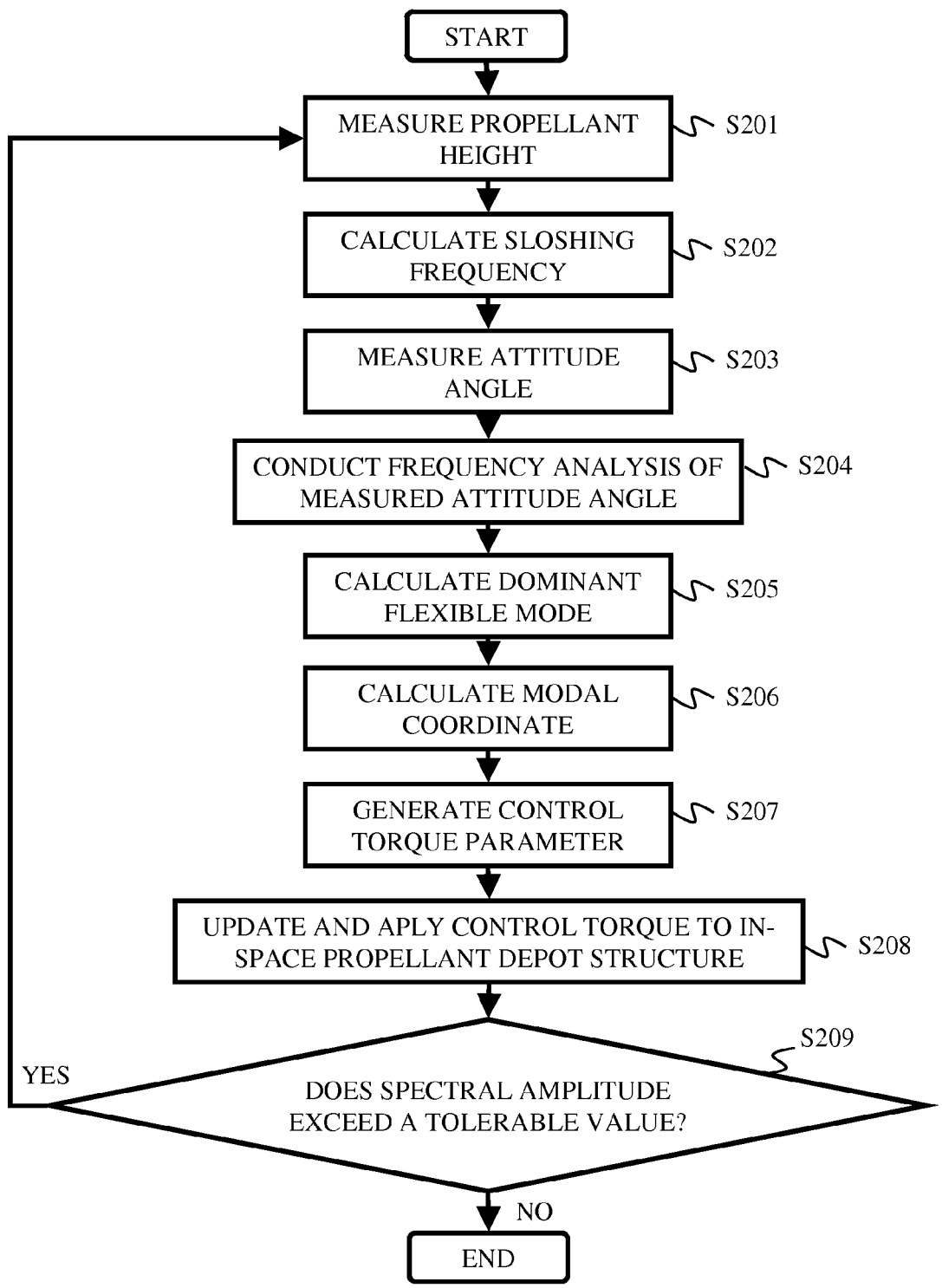
FIG. 2 is a flowchart showing a processing flow of the attitude angle controller for in-space propellant depot in accordance with an exemplary embodiment of the invention.

Next a processing flow of the attitude angle controller for in-space propellant depot 120 is described using FIG. 2. FIG. 2 is a flowchart showing a processing flow of the attitude angle controller for in-space propellant depot in accordance with an exemplary embodiment of the invention. The propellant height sensor 121 measures the propellant height h and sends it to the sloshing frequency calculation unit 122 as a measured propellant height (S201).

The sloshing frequency calculation unit 122 calculates the sloshing frequency in (4) based on the measured propellant height, and sends it to the dominant flexible mode calculation unit 125 (S202).

The attitude angle sensor 123 measures the attitude angle of the in-space propellant depot θ and sends it to the frequency analysis unit 124, the dominant flexible mode calculation unit 125, and the modal coordinate calculation unit 126 as the measured attitude angle (S203).

The frequency analysis unit 124 conducts frequency analysis of the measured attitude angle and sends the frequency spectra of the measured attitude angle to the dominant flexible mode calculation unit 125 and the control torque parameter generator 127 (S204).

The dominant flexible mode calculation unit 125 calculates the dominant flexible mode as a flexible mode of the in-space propellant depot, a flexible mode natural frequency of which is closest to either a spectral frequency of one of the plurality of frequency spectra with a largest spectral amplitude if only one such spectral frequency exists; a smaller one of two spectral frequencies of one of two frequency spectra with a largest spectral amplitude if two such spectral frequencies exist, and a larger one of two spectral frequencies is three times as large as the smaller one of two spectral frequencies; or a spectral frequency of one of three frequency spectra with the dominant spectral frequency, spectral frequencies of others being larger than the dominant spectral frequency by the sloshing frequency, and an absolute value of a difference between the dominant spectral frequency and the sloshing frequency, if three such spectral frequencies exist; and sends the dominant flexible mode to the modal coordinate calculation unit 126 and the control torque parameter generator 127 (S205).

The modal coordinate calculation unit 126 calculates the p-th modal coordinate $z_p$ in (19) where the p-th flexible mode is the dominant flexible mode applying a modal transformation to the measured attitude angle θ, and sends it to the control torque generator 128 (S206).

The control torque parameter generator 127 calculates the control torque parameter $\zeta_{cp}$ in (20) for the dominant flexible mode that is a damping ratio to be added to the dominant flexible mode adjusted to minimize the spectral amplitude of the plurality of frequency spectra of the dominant flexible mode, and sends the control torque parameter to the control torque generator 128 (S207).

The control torque generator 128 updates the control torque $T_c$ in (20) by adding a term in (20) for suppressing the vibration of the dominant flexible mode obtained in step S205, and sends it to the in-space propellant depot structure 110 (S208).

Aforementioned steps S201 through S208 are repeated until the spectral amplitude of the plurality of frequency spectra no longer exceeds a predetermined value tolerable by the in-space propellant depot by applying the control torque $T_c$ generated by the control torque generator 128 (S209).

Hereinafter, simulation results of aforementioned control processes of the attitude control device for in-space propellant depot in accordance with an exemplary embodiment of the invention are described in detail. The simulation assumes a pair of solar panels of in-space propellant depot represented as a distributed parameter system, and a cylindrical propellant tank with its neutral axis passing through a center of gravity of the body of in-space propellant depot 301 without propellant and oriented parallel to a broken line in FIG. 3 connecting the pair of solar panels of in-space propellant depot. The parameters used in the simulation are given in (21).

$$J_{b0}=131{,}250[\text{kg}\cdot\text{m}^2], \omega_s=0.0135(2\pi)[\text{rad/s}], m=5{,}000\,[\text{kg}],$$

$$R=2.5[\text{m}], L=17[\text{m}], \omega_{n1}=0.0725(2\pi)[\text{rad/s}],$$
$$\omega_{n2}=0.1667(2\pi)[\text{rad/s}],$$

$$\zeta_1=0.1, \zeta_2=0.02, \Delta=1\times10^{-3}[\text{rad}] \qquad (21)$$

where $\zeta_1$ and $\zeta_2$ are a first flexible mode damping ratio and a second flexible mode damping ratio, respectively, and Δ is an allowable fluctuation of attitude angle [rad]. The sloshing frequency $\omega_s$ is derived using (4) with a small gravitational acceleration $9.8\times10^{-3}$ [m/s$^2$] artificially introduced to stabilize the propellant by rotating the in-space propellant depot structure 110 along the neutral axis of the propellant tank, diameter and height thereof being 5 [m] and 5 [m]. The allowable fluctuation of attitude angle Δ is a maximum allowable fluctuation of attitude angle θ within which the in-space propellant depot can conduct propellant supply mission. The following simulation illustrates a reduction of fluctuation of the attitude angle of in-space propellant depot θ caused by the disturbance torque $T_d$ comprising frequency components at the first and the second flexible mode natural frequency $\omega_{n1}$ and $\omega_{n2}$ using the current invention.

Figure 4:
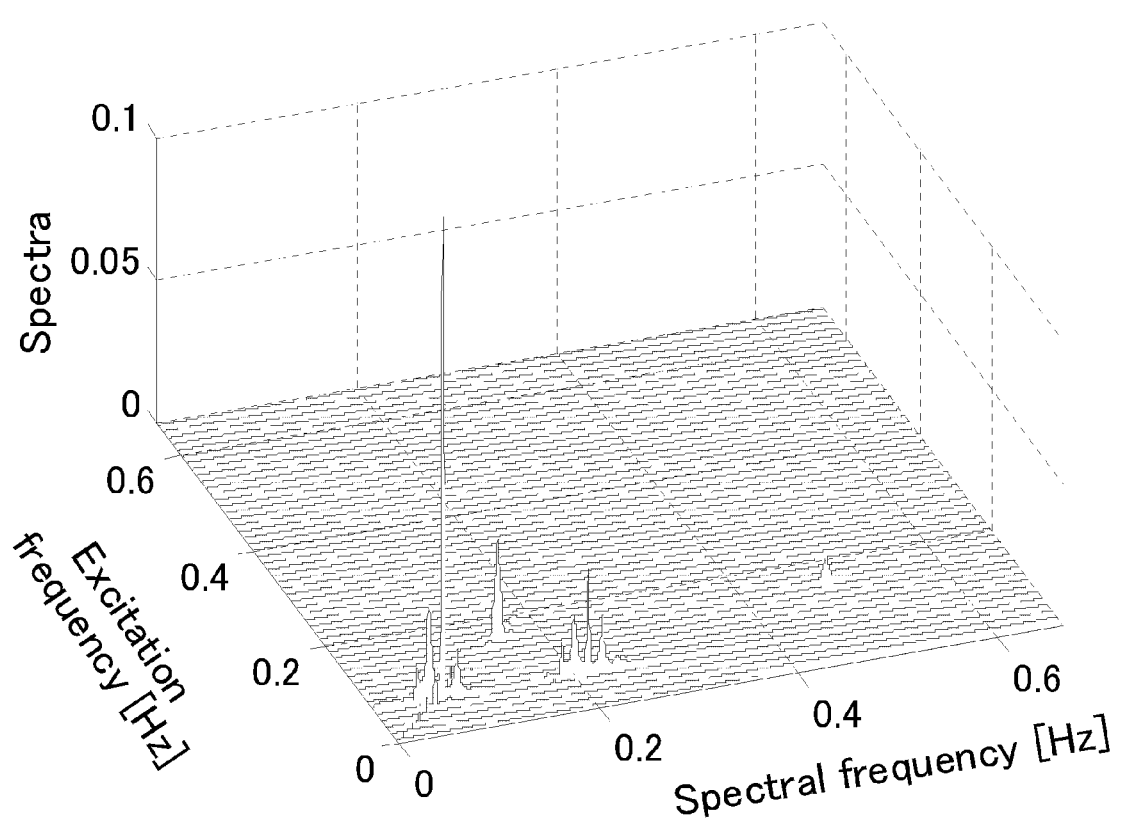
FIG. 4 is a waterfall diagram of the in-space propellant depot of the type of which an exemplary embodiment of the invention may be advantageously employed.

FIG. 4 is a waterfall diagram of the in-space propellant depot of the type of which an exemplary embodiment of the invention may be advantageously employed. FIG. 4 is obtained by applying an up-sweep sinusoidal excitation torque between $0.1\omega_{n1}$ [rad/s] and $4\omega_{n2}$ [rad/s] in a direction of the disturbance torque $T_d$ in FIG. 3. A peak at spectral frequency 0.0725 [Hz] is a primary resonance peak of the first flexible mode given by (14), a peak at spectral frequency 0.1667 [Hz] is a primary resonance peak of the second flexible mode given by (14), a peak at 0.2175 [Hz] is a subharmonic resonance peak of the first flexible mode given by (15), a peak at 0.5001 [Hz] is a subharmonic resonance peak of the second flexible mode given by (15), and other peaks are parametric resonance peaks given by (16) and (17).

Figure 5:
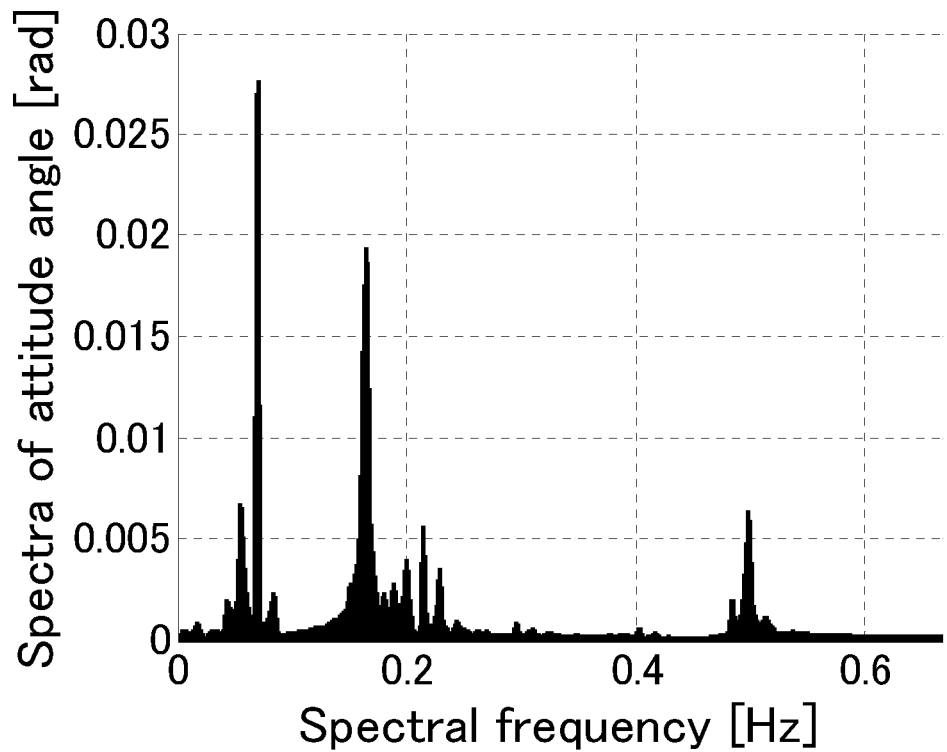
FIG. 5 is a simulation result of an exemplary embodiment of the invention showing frequency spectra of attitude angle without attitude control.

FIG. 5 is a simulation result of an exemplary embodiment of the invention showing frequency spectra of attitude angle without attitude control. In FIG. 5 the disturbance torque $T_d$ comprising frequency components at the first and the second flexible mode natural frequency $\omega_{n1}$ and $\omega_{n2}$ is applied to the in-space propellant depot structure 110, and a vibration due to aforementioned primary resonance, subharmonic resonance and parametric resonance appears in the attitude angle of in-space propellant depot θ. The spectral amplitudes are below 0.0276 [rad] that is a displacement of the vibration at a corner of the body of in-space propellant depot 301 is as large as 97.6 [mm].

Figure 6:
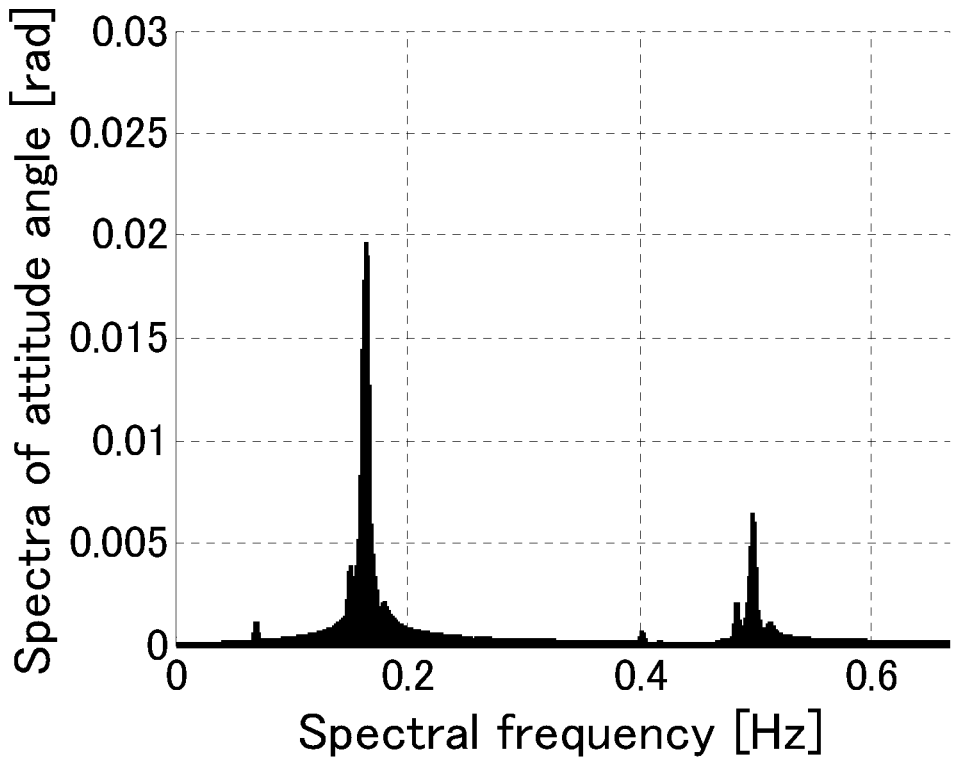
FIG. 6 is a simulation result of an exemplary embodiment of the invention showing frequency spectra of attitude angle after a first iteration of attitude control due to the current invention.

FIG. 6 is a simulation result of an exemplary embodiment of the invention showing frequency spectra of attitude angle after a first iteration of attitude control due to the current invention. In the first iteration (S201 through S208 in FIG. 2), a term in a right hand side of (20) with p=1 with a first control torque parameter $\zeta_{c1}$=0.6 is applied to the in-space propellant depot structure 110. As a result, the primary resonance peak of the first flexible mode, the subharmonic resonance peak of the first flexible mode and a plurality of parametric resonance peaks associated with the first flexible mode vanish. The first control torque parameter is calculated by the control torque parameter generator 127 such that the spectral amplitude of the plurality of frequency spectra of the dominant flexible mode that is the first flexible mode having the largest spectral amplitude in FIG. 5 is minimized. Since the frequency spectra in FIG. 5 and those in FIG. 6 are different, steps S201 through S208 in FIG. 2 are repeated.

Figure 7:
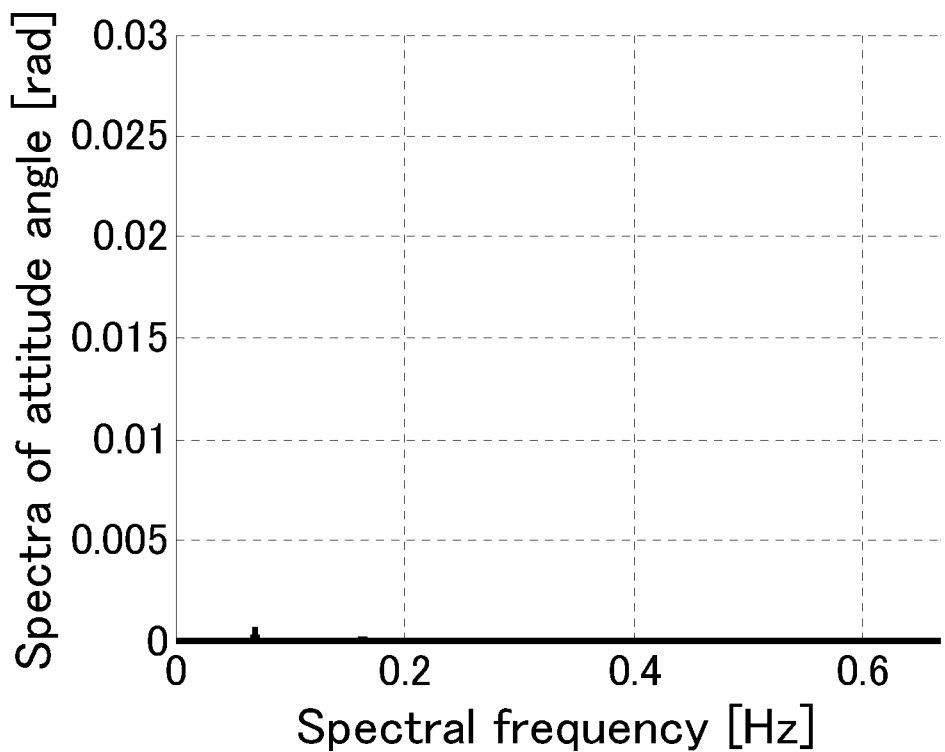
FIG. 7 is a simulation result of an exemplary embodiment of the invention showing frequency spectra of attitude angle after a second iteration of attitude control due to the current invention.

FIG. 7 is a simulation result of an exemplary embodiment of the invention showing frequency spectra of attitude angle after a second iteration of attitude control due to the current invention. In the second iteration, a term in the right hand side of (20) with p=2 with a second control torque parameter $\zeta_{c2}$=0.68 is applied to the in-space propellant depot structure 110. As a result, the spectral amplitudes of the attitude angle of in-space propellant depot θ are suppressed below 6.16× $10^{-4}$ [rad] that is a displacement of the vibration at a corner of the body of in-space propellant depot 301 does not exceed 2.2 [mm]. The current invention reduces the vibration of the body of in-space propellant depot 301 by a factor of 44.36. Since the in-space propellant depot in the simulation includes only two flexible modes as in FIG. 4, the frequency spectra in FIG. 7 no longer contains resonance peaks that require suppression to stabilize the attitude angle of in-space propellant depot θ.

Figure 8:
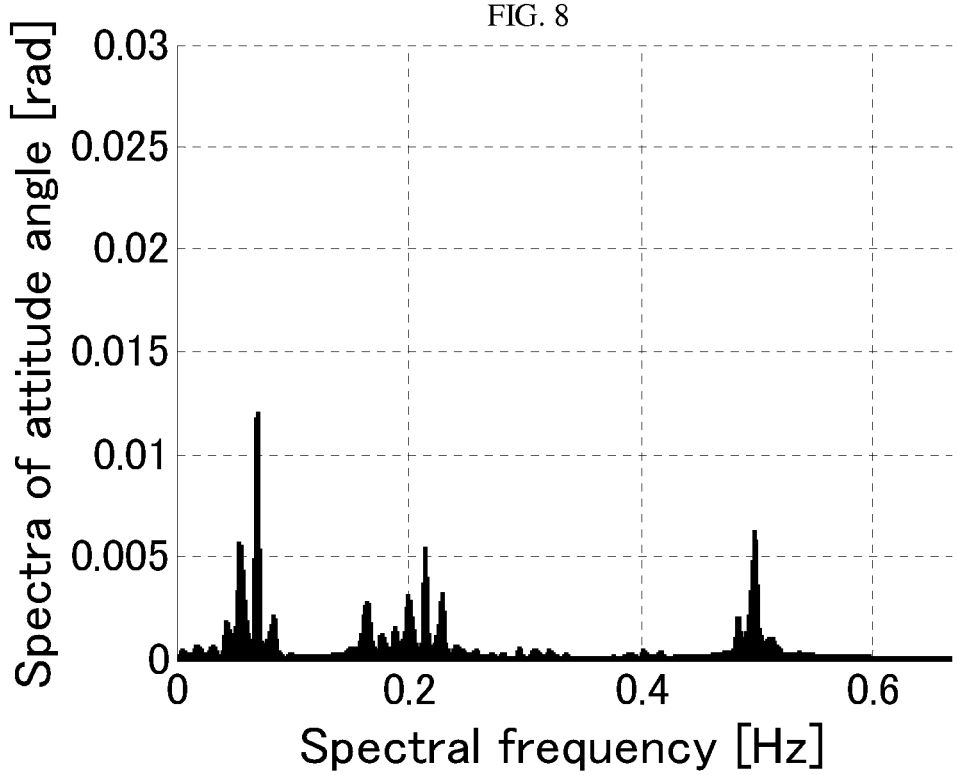
FIG. 8 is a simulation result of an exemplary embodiment of the invention showing frequency spectra of attitude angle with attitude control due to the prior art.

FIG. 8 is a simulation result of an exemplary embodiment of the invention showing frequency spectra of attitude angle with attitude control due to the prior art. With the prior art in U.S. Pat. No. 7,957,854 B2 all resonance peaks in FIG. 5 are treated as primary resonance and a control torque $T_c$ is designed to minimize the spectral amplitudes of resonance peaks by adjusting damping ratio of all resonance peaks to 0.7. Such control can reduce only primary resonance peaks but fails to reduce subharmonic resonance peaks and parametric resonance peaks. As a result, the spectral amplitudes of the attitude angle of in-space propellant depot θ are suppressed below 0.012 [rad] that is a displacement of the vibration at a corner of the body of in-space propellant depot 301 is as large as 42.4 [mm]. The prior art reduces the vibration of the body of in-space propellant depot 301 by a factor of 2.30. Therefore, the current invention is 19.27 times as effective as the prior art in stabilizing the attitude angle of in-space propellant depot θ.

Although the above simulation assumes the in-space propellant depot structure 110 including two flexible modes, the current invention can be applied, with a minor modification apparent to those skilled in the art, to a variety of in-space propellant depots including larger number of flexible modes.

The attitude control device for in-space propellant depot in the foregoing embodiment can be realized as an electrical/electronic/programmable electronic system. Examples of the electrical/electronic/programmable electronic system include but are not limited to a control system comprising an application specific integrated circuit (ASIC) or a microcontroller.

While, in the foregoing embodiment, the cylindrical propellant tank is considered, the current invention can be applied regardless of a shape of the propellant tank incorporated in the in-space propellant depot.

The described embodiments of the current invention are only exemplary and numerous variations thereof apparent to those skilled in the art are intended to be within the scope of the current invention as defined in the following claims.

The invention claimed is:

1. An attitude control device for an in-space propellant depot comprising a body of in-space propellant depot including a propellant tank for holding a propellant supplied to other spacecrafts, a reaction wheel for changing an attitude angle of the in-space propellant depot, an electronic system for implementing a plurality of functions such as propellant supply and change of attitude angle, an enclosure holding the propellant tank, the reaction wheel and the electronic system; and a plurality of solar panels mechanically attached to the body of in-space propellant depot and supplying electric energy converted from solar energy to the electronic system, the attitude control device comprising:

a propellant height sensor measuring a height of a propellant in the propellant tank and sending a measured propellant height;

a sloshing frequency calculation unit calculating a sloshing frequency based on the measured propellant height in the propellant tank and gravitational acceleration acting on the in-space propellant depot where the in-space propellant depot is deployed, and sending the sloshing frequency;

an attitude angle sensor measuring the attitude angle of the in-space propellant depot and sending it as a measured attitude angle of the in-space propellant depot;

a frequency analysis unit conducting a frequency analysis of the measured attitude angle of the in-space propellant depot, generating its frequency spectra, and sending a plurality of frequency spectra;

a dominant flexible mode calculation unit calculating a dominant flexible mode, and sending it where the dominant flexible mode is a flexible mode of the in-space propellant depot, a flexible mode natural frequency of which is closest to either a spectral frequency of one of the plurality of frequency spectra with a largest spectral amplitude if only one such spectral frequency exists; a smaller one of two spectral frequencies of one of two frequency spectra with a largest spectral amplitude if two such spectral frequencies exist, and a larger one of two spectral frequencies is odd-number times as large as the smaller one of two spectral frequencies; or a spectral frequency of one of three frequency spectra with a largest spectral amplitude (hereinafter referred to as a "dominant spectral frequency"), spectral frequencies of others being larger than the dominant spectral frequency by the sloshing frequency, and an absolute value of a difference between the dominant spectral frequency and the sloshing frequency, if three such spectral frequencies exist;

a modal coordinate calculation unit calculating a modal coordinate of the dominant flexible mode applying a modal transformation to the measured attitude angle, and sending it;

a control torque parameter generator calculating a control torque parameter that is a damping ratio to be added to the dominant flexible mode adjusted to minimize the spectral amplitude of the plurality of frequency spectra of the dominant flexible mode, and sending the control torque parameter; and a control torque generator calculating a term of a control torque for reducing the spectral amplitude of the dominant flexible mode as a product of the modal coordinate, the control torque parameter and 1p element of a modal matrix of the modal transformation where p is a number of the dominant flexible mode, adding it to a control torque calculated in a previous iteration, and sending it until the spectral amplitude of all the frequency spectra no longer exceeds a predetermined value tolerable by the in-space propellant depot.

* * * * *